March 15, 1927.
E. A. NERBY
ANIMAL TRAP
Filed Nov. 2, 1925
1,620,777
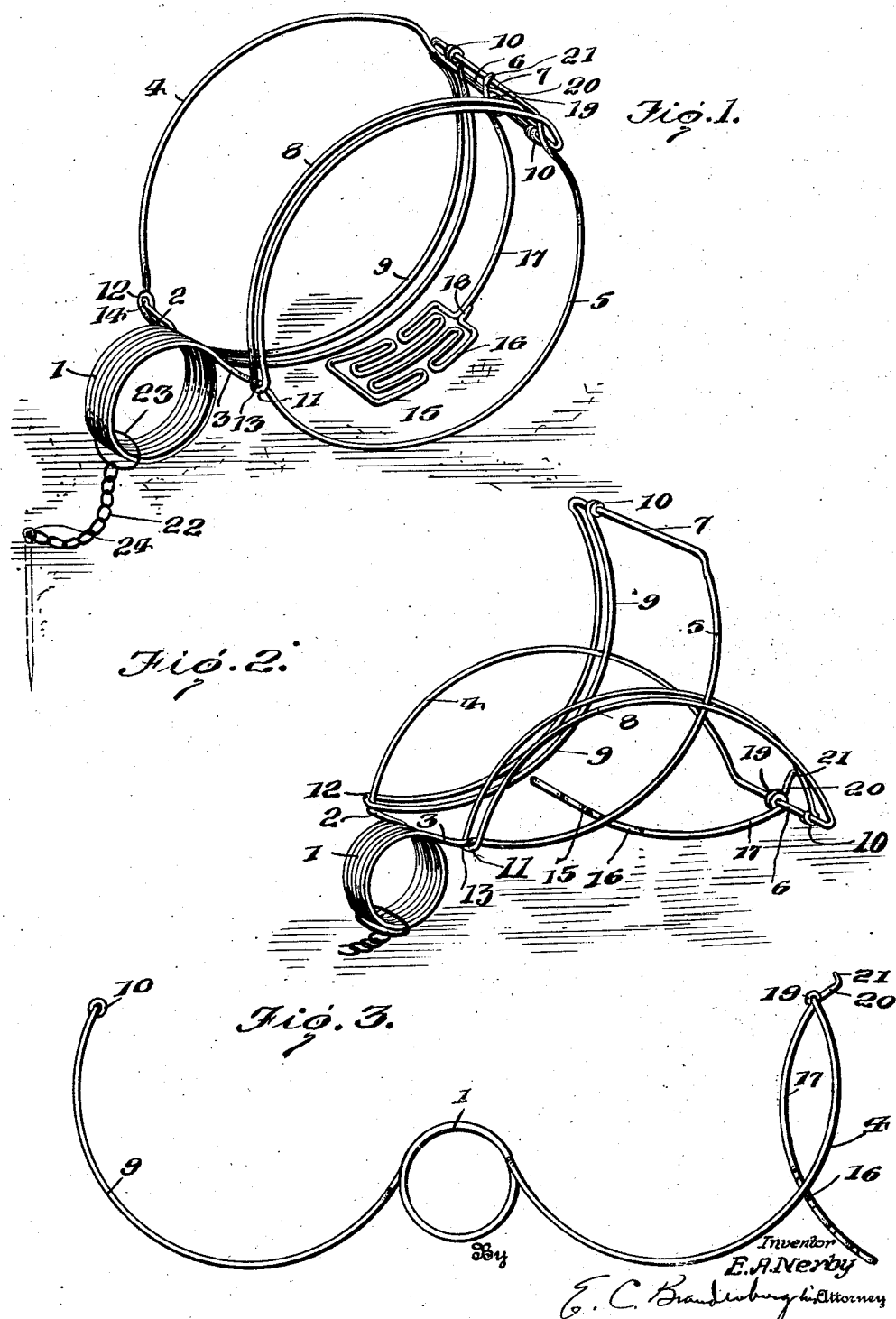

Patented Mar. 15, 1927.

1,620,777

UNITED STATES PATENT OFFICE.

EDGAR A. NERBY, OF MILWAUKEE, WISCONSIN.

ANIMAL TRAP.

Application filed November 2, 1925. Serial No. 66,342.

My invention relates to an improvement in animal traps.

The object of the invention is to provide an animal trap of the choke-type, which prevents both the escape and the prolonged suffering of the animal after it is caught.

A further object of the invention is to provide a device of this character which will be simple of construction, durable in use, comparatively inexpensive of production, and efficient in action.

In the accompanying drawings:

Fig. 1 is a perspective view of the trap in its set position;

Fig. 2 is a similar view of the trap in its sprung position;

Fig. 3 is a side elevation of the trap when open to be set.

The numeral 1 indicates a spring formed of coiled wire, the ends of which extend laterally in the form of horizontal projections 2 and 3 which terminate in substantially semi-circular upper and lower single bails 4 and 5, respectively. These bails 4 and 5 are bent laterally in the form of horizontal end wires 6 and 7, respectively, which end wires are bent in the form of extended loops to form the upper and lower double bails 8 and 9, the free ends 10 of these bails being wrapped around the horizontal end wires 6 and 7 for securing the same in their proper positions. The end loops 11 and 12 of the double bails 8 and 9 are received in off-set curved portions 13 and 14 at the points where the extensions 2 and 3 terminate into the single bails 4 and 5, so as to hold these double bail wires in their proper positions and to afford a pivotal point therefor.

The trigger 15 of the device is formed of the pan 16 made of a single length of wire, bent into the peculiar construction shown in the drawings, and this pan is provided with an extension 17, which is one end of the length of wire, the opposite end thereof being welded to this extension as at 18. The extension 17 extends to and is wrapped around the horizontal end wire 6 as at 19 to provide a pivotal point for the extension relative to this end wire, the extreme outer end of the extension wire 17 terminating in a finger 20 having an overhanging lug 21 on the end thereof.

Any suitable means may be employed for preventing the animal from carrying off the trap, and for this purpose, I have shown a chain 22 which is secured by means of a ring 23 to the spring 1 and has its opposite end secured to a suitable securing peg 24.

To set the trap, the horizontal end wires 6 and 7 are pushed together, making the single bail wires 4 and 5 project between the double bail wires 8 and 9, as shown in Fig. 1, and the pan 16 of the trigger 15 is raised or moved about the end wire 6 until the overhanging lug 21 catches and securely holds the horizontal end wire 7, thus holding these end wires together as clearly shown in Fig. 1.

When an animal attempts to pass through the bails or to insert its head or foot therebetween, it comes into contact with the trigger and moves the same downwardly or radially about its pivotal point 19, thus moving the overhanging lug 21 out of contact with the horizontal end wire 7, allowing these end wires to be sprung away from each other, by means of the spring 1, thus choking the animal between the upper and lower bails.

It will thus be seen that I have provided an improved animal trap which is preferably made of a circular formation, so that, when the animal attempts to pass therethrough, it will release the trigger and cause the coacting jaws of the trap to spring together, thus securely holding the animal within the trap, without causing undue suffering thereto.

Traps of this character may be made in various sizes to accommodate the different sized animals, and various other changes and modifications in the form, proportions, and details of construction may be made without departing from the scope of my invention, as set forth in the following claims.

I claim:

1. A trap including oppositely arranged pairs of upper and lower coacting bails, end wires connecting the pairs of bails together, and a trigger connected with at least one of said end wires for holding the jaws in their set positions.

2. A trap including a pair of coacting jaws formed of single and double upper and lower bails and terminating in cross end wires, a trigger carried by one of said end wires in position to engage another of said end wires for holding the jaws in their set positions.

3. A trap including a pair of coacting jaws formed of upper and lower single and double bail wires, the single bail wires extending through the double bail wires and terminating in cross end wires, a trigger connected with one of the cross end wires in position to engage another of said cross end wires for holding the coacting jaws in their set positions.

4. A trap including a pair of coacting jaws formed of upper and lower single and double bail wires, the single bail wires extending through the double bail wires and terminating in cross end wires, a trigger connected with one of the cross end wires in position to engage another of said cross end wires for holding the coacting jaws in their set positions, and a spiral spring connected with the single bail wires for actuating said wires when the trigger is released to spring the trap.

5. An animal trap including a spiral spring having the ends thereof bent laterally and terminating in substantially semi-circular upper and lower single bail wires, said bail wires being bent toward each, forming horizontal end wires, upper and lower double bail wires for receiving the single bail wires, and a trigger having an extension formed thereon pivotally connected with one of the horizontal end wires, and terminating in an overhanging lug for engaging another of said end wires for holding the upper and lower bail wires in their set positions.

6. An animal trap including a spring having the ends thereof bent laterally in the form of lateral extensions, said lateral extensions terminating in substantially semi-circular upper and lower single bail wires, said extensions being provided with off-set curved portions at the ends of the single bail wires, said single bail wires being bent toward each other providing horizontal end wires, the ends thereof being bent into substantially semi-circular upper and lower double bail wires for receiving the single bail wires and having loops formed at the ends thereof for being received in the off-set curved portions, the free ends of the double bail wires being wrapped around the horizontal end wires, and a trigger provided with an extension having a pivotal connection on one of the horizontal end wires and being provided with an overhanging lug for engaging another of said horizontal end wires, for holding the upper and lower bail wires in their set positions.

In testimony whereof I affix my signature.

EDGAR A. NERBY.